United States Patent [19]

Lagally

[11] 3,954,686
[45] May 4, 1976

[54] LOW DENSITY FOAM RESIN COMPOSITE OF HIGH STIFFNESS

[75] Inventor: Paul Lagally, Annapolis, Md.

[73] Assignee: The United States of America as represented by the Secretary of the Navy, Washington, D.C.

[22] Filed: Mar. 20, 1975

[21] Appl. No.: 560,080

[52] U.S. Cl. .................... 260/2.5 AK; 260/2.5 BE; 260/859 R
[51] Int. Cl.² .......................................... C08G 18/14
[58] Field of Search .............. 260/859, 77.5 CR, 42, 260/42.53, 2.5 AK, 2.5 BE, 42.47

[56] References Cited
UNITED STATES PATENTS

| | | | |
|---|---|---|---|
| 3,510,392 | 5/1970 | D'Eustachio et al. | 260/2.5 AK |
| 3,515,772 | 6/1970 | Lubowitz et al. | 260/77.5 CR |
| 3,585,157 | 6/1971 | Beck | 260/2.5 AK |
| 3,700,752 | 10/1972 | Hutchinson | 260/2.5 BE |
| 3,849,350 | 11/1974 | Matsko | 260/42.53 |
| 3,850,861 | 11/1974 | Fabris et al. | 260/77.5 CR |
| 3,865,898 | 2/1975 | Tobolsky | 260/77.5 CR |
| 3,868,431 | 2/1975 | Hutchinson | 260/77.5 CR |

*Primary Examiner*—H. S. Cockeram
*Attorney, Agent, or Firm*—R. S. Sciascia; J. A. Cooke; R. D. Johnson

[57] ABSTRACT

The present invention relates to a method of producing low density polydiene resins having high yield strengths and the products thereof. In particular a polydiene resin, such as dihydroxyl terminated 1,2-polybutadiene is reacted at room temperature with an organic chain extender, such as hexamethylene -1,6-diisocyanate, and a graft comonomer such as N-vinyl-2-pyrrolidone in the presence of a peroxide free radical initiator, such as O,O'-bis(t-butyl peroxy) diisopropylbenzene, whereby a elastomeric material having the peroxide and a graft comonomer dispersed therethrough is produced. At a subsequent period of time, the elastomeric material can be exposed to elevated temperatures whereupon the elastomer is cured to a low density resin having a high yield strength.

4 Claims, No Drawings

LOW DENSITY FOAM RESIN COMPOSITE OF HIGH STIFFNESS

BACKGROUND OF THE INVENTION

This invention relates to polydiene resins and more particularly to polydiene resins having either urethane or epoxyl groups.

For a variety of applications (e.g. deep sea buoyancy structures, aviation structures, etc.) low density plastic resins having high compressive yield strengths are needed. The state of the art teaches that functionally terminated 1,2-polybutadiene resins, which are chain extended with a diisocyanate or diepoxide, may exhibit a low density and a remarkable ultimate strength exceeding that of many other high strength plastic materials. However, these resins lack high yield strengths and high elastic moduli.

For example, resin composite obtained from dihydroxyl 1,2-polybutadiene and toluene-2,4-diisocyanate had, after ring closure and/or crosslinking with a peroxide, a density of 1.04 and an ultimate compressive strength of 38,400 psi but a yield strength of only 5,500 psi and a compressive modulus of 225,000 psi. By comparison, a conventional epoxy resin had a density of 1.24, an ultimate compressive strength of 21,000 psi, a yield strength of 18,000 psi, and a compressive modulus of 500,000 psi. However, because conventional epoxy resins have high densities, they are less desirable for aviation or deep sea buoyancy structures than the low density polydiene resins. Therefore, it would be desirable to find novel low density polydiene resins having higher yield strengths than the prior art low density polydiene resins.

SUMMARY OF THE INVENTION

Accordingly, one object of this invention is to provide novel low density polydiene resins.

Another object of this invention is to provide low density thermosetting polyolefinic resins having higher yield strengths.

A further object of this invention is to provide low density, high yield strength, thermosetting resins having viscosity and cure characteristics suitable for the fabrication of castable plastic materials under the conditions of vacuum potting.

A still further object of this invention is to provide a method of manufacturing low density polydiene resins having higher yield strengths.

These and other objects of this invention are accomplished by providing a resin which is produced by reacting (A) a difunctional polydiene prepolymer having (1) two terminal functional groups selected from the group consisting of hydroxyl and carboxyl and (2) a predominant amount of vinyl groups on alternate carbon atoms of the polydiene backbone with (B) a chain extender, provided that when the terminal functional groups on the polydiene are hydroxyl groups, the chain extender is a diisocyanate, but when the functional groups on the polydiene are carboxyl groups, the chain extender is a diepoxide, at ambient temperature in the presence of (C) a graft comonomer selected from the group consisting of N-vinyl-2-pyrrolidone, N-vinyl-3-pyrrolidone, N-vinylcarbazole, N-vinylimidazole, N-vinylpyridine, coumarone, indene, and mixtures thereof, and (D) a peroxide free radical initiator to produce the reaction product. This reaction product can then be cured at elevated temperatures to produce the final polydiene resin.

DETAILED DESCRIPTION OF THE PREFERRED EMBODIMENT

The backbone of the resin of the present invention is formed either (1) by reacting a dihydroxyl polydiene prepolymer with a diisocyanate as a chain extender to form a polyurethane polydiene resin or (2) by reacting a dicarboxyl polydiene with a diepoxide to form an epoxy polydiene resin. Because of their greater yield strengths, the polyurethane polydiene resins are preferred over the epoxy polydiene resins.

The dihydroxyl or dicarboxyl terminated polydiene prepolymers used in the present invention should have a high residual vinyl or alkenyl content. Polydienes derived from isoprene, dimethylbutadiene, methylpentadiene, or butadiene are suitable, with dicarboxyl 1,2-polybutadiene and dihydroxyl 1,2-polybutadiene being preferred and dihydroxyl 1,2-polybutadiene being more preferred. Dihydroxyl and dicarboxyl polydiene prepolymers having molecular weights of from about 600 to about 3000 are preferred. If the molecular weight exceeds 3000, the prepolymers become too viscous for proper casting and potting operations.

The chain extenders for the dihydroxyl polybutadiene prepolymers may be aromatic as represented by toluene-2,4-diisocyanate or naphthalene-1,5-diisocyanate. However, the non-aromatic diisocyanates (e.g. hexamethylene-1,6-diisocyanate, 2,2,4-trimethylhexamethylene-1,6-diisocyanate, isophorone diisocyanate, dicyclohexylmethane diisocyanate) are preferred because they undergo urethane and allophanate formation rather slowly thus displaying low viscosities during the casting and vacuum potting operation. Isophorone diisocyanate is the more preferred chain extender.

The key feature of this invention is the grafting of a cylic monomer selected from the group consisting of N-vinyl-2-pyrrolidone, N-vinyl-3-pyrrolidone, N-vinylcarbazole, N-vinylimidazole, N-vinylpyridine, coumarone, indene and mixtures thereof onto the polymer backbone. The preferred graft monomers are N-vinyl-2-pyrrolidone, N-vinyl-3-pyrrolidone, and mixtures thereof.

Although the free radical initiator used is not a critical limitation, 0,0'-bis(t-butylperoxy) diisopropylbenzene works well as the catalyst. Preferably about 2 parts by weight of the free radical initiator should be used for every 100 parts by weight of the dihydroxyl or dicarboxyl polydiene prepolymer.

The preferred range of the molar ratio of aliphatic diisocyanate to dihydroxyl polydiene prepolymer is from about 0.75:1 to about 1.30:1, with from 0.95:1 to 1.10:1 being the more preferred range. For instance, preferably from 12 to 20 and more preferably from 15 to 18 parts by weight of isophorene diisocyanate chain extender (MW=222) should be used with every 100 parts by weight of dihydroxyl 1,2-polybutadiene prepolymer (MW = 1420).

If aromatic diisocyanates are reacted with the dihydroxyl polydiene prepolymer, an excess of the aromatic diisocyanate should be used for proper viscosity control. Thus, the preferred range of the molar ratio of aromatic diisocyanate to dihydroxyl polydiene prepolymer is from about 0.95:1 to about 1.65:1, with from 1.20:1 to 1.50:1 being the more preferred range. For example, preferably from about 12 to about 20 and more preferably from 15 to 18 parts by weight toluene diisocyanate chain extender (MW = 174) should be used for every 100 by weight of the dihydroxyl 1,2-polybutadiene prepolymer (MW = 1420) used.

The preferred range of the molar ratio of the cyclic graft comonomer used in this invention to the dihydroxyl or dicarboxyl polydiene prepolymer is from about 0.60:1 to about 6.40:1 with from 4.45:1 to 5.75:1 being the more preferred range. For instance, from about 5 to about 50, and more preferably from 35 to 45 parts by weight of N-vinyl-2-pyrrolidone (MW = 111) should be used for every 100 parts by weight of dihydroxyl 1,2-polybutadiene prepolymer (MW = 1420). The amount of N-vinyl-2-pyrrolidone which can be used for a given weight of prepolymer is limited by the hygroscopic properties of the vinyl pyrrolidone.

These cyclic graft comonomers are grafted onto an already existing polydiene polymer backbone and therefore are to be distinguished from polymers where the cyclic comonomers are part of the backbone itself.

The difunctional polydiene prepolymer, chain extender, cyclic graft comonomer, and free radical initiator are all mixed together and allowed to react at ambient temperature for about 1 hour. Later the reaction mixture may be poured into casts or structural spaces and cured at elevated temperatures.

Moreover, by embedding glass or phenolic microspheres into the reaction mixture before the curing step at elevated temperatures, syntactic buoyancy foams having superior strength and buoyancy characteristics are obtained. Note that before the curing step at elevated temperatures, the reaction mixture contains some unreacted isocyanate groups which have an inherent reactivity with silanol (or other metal hydroxide) groups located in the surface of the glass microspheres. The pyrrolidone moieties contribute further to the adhesiveness of the resin matrix. And finally, adhesion promotors derived from silyperoxides (e.g. tris(-tert-butylperoxy) vinyl silane) drastically increase bond strength and they reduce water absorption of the glass resin interface.

The following examples serve to illustrate the present invention without, however, limiting the same thereto:

EXAMPLE 1

To 100 parts by weight dihydroxyl 1,2-polybutadiene having the properties:

| | |
|---|---|
| Molecular Weight | 1420 |
| Vinyl Content,% | 91.5 |
| Hydroxy Content, Meg/gr | 1.19 |
| Viscosity, poises at 45°C | 55 | there was added a mixture of 15 parts by weight isophorone diisocyanate, 40 parts by weight N-vinyl-2-pyrrolidone and 4 parts by weight 0,0′-bis(t-butylperoxy) diisopropylbenzene (commercially known as "Vul-Cup R"). After stirring until homogenous, the resulting reaction product maintained over a period of one hour the following temperature-viscosity relationship:

| TEMPERATURE (°C) | VISCOSITY (cp) |
|---|---|
| 24 | 550 |
| 50 | 220 |
| 80 | 110 |
| 110 | 50–100 |

The product was poured into a mold and cured consecutively 48 hours at 90°C plus 24 hours each at 100°C, 110°C and 120°–200°C.

The cured castings had the following strength characteristics:

| | |
|---|---|
| Yield Strength (0.2% offset), psi | 11800 |
| Ultimate Strength, psi | 27500 |
| Compressive Modulus, psi | 450000 |
| Density (gr/cc) | 1.04 |

EXAMPLE 2

Example 1 was repeated omitting the N-vinyl-2-pyrrolidone. The viscosity rose from 350 to 1250 centipoises at 90°C over a period of 1 hour and the following strength characteristics of the cured resin were determined:

| | |
|---|---|
| Yield Strength (0.2% offset), psi | 7400 |
| Ultimate Strength, psi | 36000 |
| Compressive Modulus, psi | 367000 |
| Density (gr/cc) | 1.04 |

EXAMPLE 3

To successive portions of 200 parts by weight dihydroxyl 1,2-polybutadiene having properties as described in Example 1, there were added 36 parts by weight toluene-2,4-diisocyanate and subsequently 10, 20, and 40 parts by weight N-vinyl-2-pyrrolidone. Finally, 4 parts by weight 0,0′-bis(t-butylperoxy) diisopropylbenzene was stirred into the mixture.

Castings made were cured consecutively 24 hours each at 90°–115°C, 105°–120°C, and 120°–140°C.

The following table summarizes the compositions (in parts by weight) and the strength characteristics of the cured castings:

| | A | B | C | D |
|---|---|---|---|---|
| dihydroxyl 1,2-polybutadiene | 200.0 | 200.0 | 200.0 | 200.0 |
| Toluene-2,4,diisocyanate | 36.0 | 36.0 | 36.0 | 36.0 |
| N-vinyl-2-pyrrolidone | 0.0 | 10.0 | 20.0 | 40.0 |
| Vul-Cup R | 4.0 | 4.0 | 4.0 | 4.0 |
| Compressive Yield Strength, psi (0.2% offset) | 8100 | 9781 | 9970 | 11000 |
| Ultimate Strength, psi | 42000 | 28000 | 21000 | 25800 |
| Compressive Modulus, psi | 328000 | 331000 | 345000 | 385000 |
| Density (gr/cc) | 1.00 | 1.03 | 1.03 | 1.04 |

EXAMPLE 4

Mixtures of dihydroxyl 1,2-polybutadiene, isophoronediisocyanate, N-vinyl-2-pyrrolidone, trimethylolpropane trimethacrylate and 0,0′-bis(t-butylperoxy) diisopropylbenzene were prepared from the following aliquot parts:

|                              | A     | B     | C     | D     | E     |
|------------------------------|-------|-------|-------|-------|-------|
| dihydroxyl 1,2-polybutadiene | 200.0 | 200.0 | 200.0 | 200.0 | 200.0 |
| Isophoronediisocyanate       | 30.0  | 30.0  | 30.0  | 30.0  | 30.0  |
| N-vinyl-2-pyrrolidone        | 20.0  | 40.0  | 40.0  | 20.0  | 20.0  |
| Trimethlolpropane Trimethacrylate | 0.0 | 0.0 | 20.0 | 10.0 | 10.0 |
| Vul-Cup R                    | 4.0   | 4.0   | 4.0   | 4.0   | 4.0   |

After mixing, casting and curing as described in Example 1, the following strength data were obtained:

|                              | A      | B      | C      | D      | E      |
|------------------------------|--------|--------|--------|--------|--------|
| Yield Strength (0.2% offset), psi | 7800 | 9700 | 10350 | 8400 | 9150 |
| Ultimate Strength, psi       | 22000  | 17600  | 28400  | 31500  | 31000  |
| Compressive Modulus, psi     | 339000 | 378000 | 437000 | 387000 | 400000 |
| Density (g/cc)               | 1.04   | 1.04   | 1.04   | 1.04   | 1.04   |

EXAMPLE 5

A syntactic foam buoyancy material was prepared by the maximum random packing of B-35D hollow glass microspheres (3M Company) in a mixture of a low density prepolymer containing the modifiers. The basic resin matrix consisted of 325 parts (by weight) dihydroxy 1,2-polybutadiene, 49 parts isophorone diisocyanate and 13 parts 0,0'-bis (tert-butylperoxy) diisopropylbenzene (commercially known as "Vul-Cup R") used as vulcanizing agent. Modification for increased stiffness and interfacial bonding comprised 130 parts vinylpyrrolidone, 65 parts trimethylolpropane trimethacrylate and 13 parts (tert-butylperoxy) vinyl silane. After deaeration in a vacuum potter, the obtained glass-resin composite was submitted to the following cure cycle: 48 hours at 90°C, 48 hours at 100°–110°C and 24 hours at 120°–200°C. The syntactic foam thus obtained had physical characteristics as follows:

| Specific Gravity | 0.567 (35.3 pcf) |
|---|---|
| Compressive Hydrostatic Strength, psi | 16,200 |
| Ultimate Compressive Strength, psi | 11,500 |
| 0.2% Offset Yield Strength, psi | 11,100 |
| Compressive Modulus, psi | 427,000 |
| Water Absorption after 168 hours) at 9000 psi, percent | 3.1 |

EXAMPLE 6

A syntactic foam buoyancy material was prepared by the maximum random packing of B-35D hollow glass microspheres (3M Company) in a mixture of a low density resin prepolymer containing the modifiers. The basic resin matrix consisted of 325 parts (by weight) dihydroxyl 1,2-polybutadiene, 49 parts isophorone diisocyanate and 13 parts 0,0'-bis(tert-butylperoxy) diisopropylbenzene. After deaeration in a vacuum potter, the obtained glass-resin composite was submitted to the following cure cycle: 48 hours at 90°C, then 48 hours at from 100° to 110°C, and finally 24 hours at from 120° to 200°C. The syntactic foam thus obtained had physical characteristics as follows:

| Specific Gravity | 0.552 (34.4 pcf) |
|---|---|
| Compressive Hydrostatic Strength, psi | 14,900 |
| Ultimate Compressive Strength, psi | 10,900 |
| 0.2% Offset Yield Strength, psi | 9,800 |
| Compressive Modulus, psi | 334,000 |
| Water Absorption (after 168 hours at 900 psi), percent | 6.1 |

What is claimed as new and desired to be secured by Letters Patent of the United States is:

1. A process for producing a syntactic foam comprising: (I) reacting (A) a dihydroxy polydiene having (1) two terminal hydroxy groups and (2) a predominate amount of vinyl groups on alternate carbon atoms of the polydiene backbone with (B) an organic chain extender which is a diisocyanate in the presence of (C) a graft comonomer selected from the group consisting of N-vinyl-2-pyrrolidone, N-vinyl-3-pyrrolidone, N-vinylcarbazole, N-vinylimidazole, N-vinyl-pyridine, coumarone, indene and mixtures thereof, (D) a peroxide free radical initiator, and (E) a tris(alkylperoxy) vinyl silane to produce an elastomeric material having the peroxides,, the tris(alkylproxy) vinyl silane, and the graft comonomer dispersed therethough substantially unreacted, (II) packing microspheres into the elastomeric material wherein the microspheres are selected from the group consisting of hollow glass microspheres, hollow phenolic microspheres and mixtures thereof, and then (III) curing the elastomer at elevated temperatures to produce a firm resinous material containing the microspheres.

2. The process of claim 1 wherein the tris(alkylperoxy) vinyl silane is tris(tert-butylperoxy) vinyl silane.

3. The product of the process of claim 1.

4. The product of the process of claim 2.

* * * * *